(No Model.)
W. H. MORGAN.
BICYCLE PROP OR SUPPORT.
No. 577,403. Patented Feb. 16, 1897.
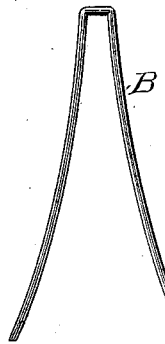
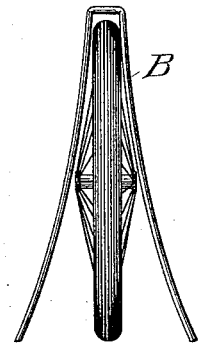
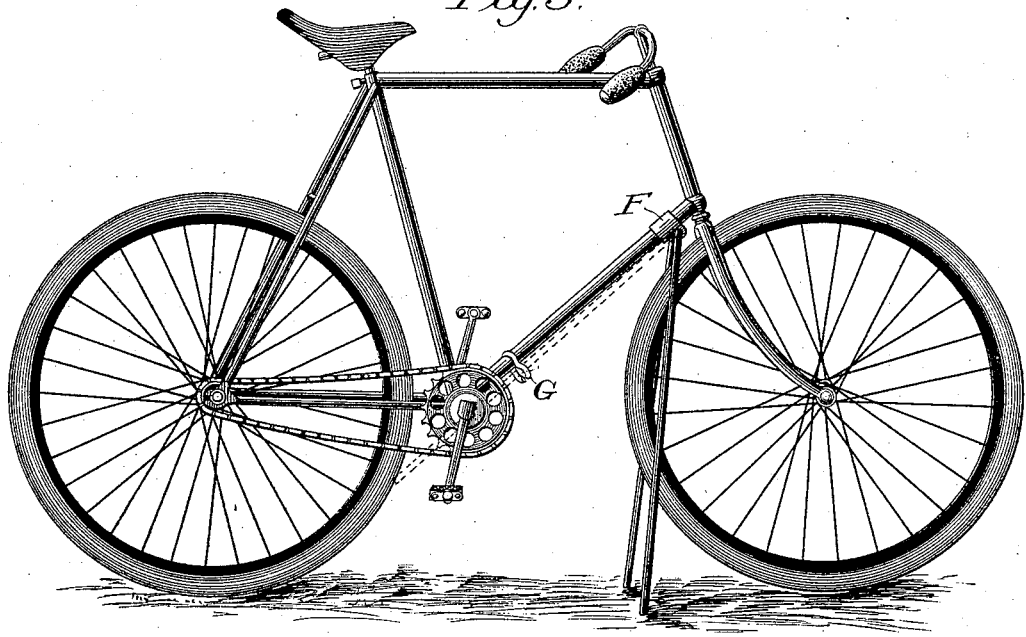
Witnesses.
H. R. Watson
Geo. Finnk
Inventor.
Wm. H. Morgan.

UNITED STATES PATENT OFFICE.

WILLIAM HENRY MORGAN, OF PEABODY, KANSAS.

BICYCLE PROP OR SUPPORT.

SPECIFICATION forming part of Letters Patent No. 577,403, dated February 16, 1897.

Application filed January 21, 1896. Serial No. 576,301. (No model.)

*To all whom it may concern:*

Be it known that I, WILLIAM HENRY MORGAN, a citizen of the United States, residing at Peabody, in the county of Marion and State of Kansas, have invented new and useful Improvements in Bicycle Props or Supports, of which the following is a full, clear, and exact description, such as will enable others skilled in the art to which it appertains to make and use the same.

The object of this invention is to provide a convenient, ever-ready, cheap, substantial, and reliable support for a bicycle, which will combine the following advantages, to wit: First, it may be attached to or detached from the bicycle-frame without injury or alteration of the frame; second, it may be attached and constantly carried on the bicycle, adding but a few ounces in weight; third, it thus answers the purposes of a bicycle stand or holder ever ready at hand when wanted, and, fourth, its simplicity and easy construction enable it to be very cheaply manufactured.

The invention is clearly illustrated in the accompanying drawings, which, with the letters of reference marked thereon, form a part of this specification, in which—

Figure 1 represents the prop or support; Fig. 2, a rear view showing the prop over a wheel, clasping and supporting it; Fig. 3, a side view of bicycle as supported, showing position of the support and its two clamps.

Fig. 1 is a view of my support, as usually made of steel or other metal. The two angles at the top B are nearly right angles and the short length between them forms part of the hinge when attached to a bicycle. Sometimes I make the legs in slightly-varying curves to suit the make of different bicycles, always so curving them that, when in use, the upper portions of the two legs shall be sufficiently close together to bind the tire of the front wheel, while at the same time the lower ends of the legs rest on the ground a sufficient distance apart, one on each side of the bicycle, bracing the latter in an upright position.

Fig. 2 illustrates the position of the prop or support as used over the wheel, the two legs or standards being sufficiently near together under the two corners at B to bind the wheel-tire so as to hold the wheel firmly and safely, preventing it from accidentally turning in any direction or falling over, and the lower ends of the two legs rest firmly on the ground.

Fig. 3 shows the support used on a bicycle. It is attached to the lower bar which connects the front frame to the rear, and as near to the front post as practicable, (F,) so that the top of the support will be over the pilot-wheel and will hold it as described above and shown in Fig. 2. The clamp F is of simple shape, attached to the bar by having its two ends drawn firmly together with a common bolt and nut. The lower part of the clamp has a small transverse lip or projection curled horizontally about the short piece of the prop between its two angles and with it forms a hinge. The clamp G is also of simplest design, drawn tightly about the lower end of the same bar with a bolt and nut and having a curved transverse hook on the lower side to hold the lower ends of the legs of the prop when not in use.

Having thus described my invention, I claim as new and desire to secure by Letters Patent—

1. The combination, with a bicycle, of a prop or support hinged to a clamp over the pilot-wheel and consisting of two legs or standards, one on each side of the pilot-wheel, the upper portion of the legs being sufficiently close to each other to clasp the pilot-wheel firmly, substantially as described.

2. The combination with a bicycle, of a portable prop or support, hinged to a clamp over the pilot-wheel, and consisting of two legs or standards, one on each side of the pilot-wheel, the upper portion of the legs being sufficiently close to each other to clasp the pilot-wheel firmly—and when not in use the two legs to be sprung together and carried under the cross-bar of the bicycle-frame, with their lower ends resting in a hook on the clamp G, substantially as described.

In testimony whereof I affix my signature in presence of two witnesses.

WILLIAM HENRY MORGAN.

Witnesses:
   H. B. WATSON,
   GEO. S. FUNK.